United States Patent
Qin et al.

(10) Patent No.: US 12,463,885 B2
(45) Date of Patent: Nov. 4, 2025

(54) FAULT DETECTION METHOD, APPARATUS, AND SYSTEM

(71) Applicant: Huawei Technologies Co., Ltd., Shenzhen (CN)

(72) Inventors: Tao Qin, Beijing (CN); Yang Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 18/412,158

(22) Filed: Jan. 12, 2024

(65) Prior Publication Data

US 2024/0163192 A1 May 16, 2024

Related U.S. Application Data

(63) Continuation of application No. PCT/CN2022/102106, filed on Jun. 29, 2022.

(30) Foreign Application Priority Data

Jul. 16, 2021 (CN) .......................... 202110806333.3
Sep. 3, 2021 (CN) .......................... 202111031854.2

(51) Int. Cl.
*H04L 43/0817* (2022.01)
*H04L 43/0811* (2022.01)
*H04L 45/02* (2022.01)

(52) U.S. Cl.
CPC .......... *H04L 43/0811* (2013.01); *H04L 45/04* (2013.01)

(58) Field of Classification Search
None
See application file for complete search history.

(56) References Cited

U.S. PATENT DOCUMENTS

| | | | |
|---|---|---|---|
| 2006/0233181 A1 | 10/2006 | Raszuk et al. | |
| 2007/0180104 A1 | 8/2007 | Filsfils et al. | |
| 2018/0077051 A1* | 3/2018 | Nainar | H04L 45/745 |
| 2020/0296025 A1* | 9/2020 | Wang | H04L 12/4641 |

FOREIGN PATENT DOCUMENTS

| | | | | |
|---|---|---|---|---|
| CN | 109873760 A | * | 6/2011 | ......... H04L 12/4625 |
| CN | 102394794 A | | 3/2012 | |
| CN | 110391951 A | | 10/2019 | |
| CN | 111901235 A | | 11/2020 | |

(Continued)

OTHER PUBLICATIONS

English Machine Translation of WO 2020/134739 (Year: 2020).*

(Continued)

*Primary Examiner* — June Sison
(74) *Attorney, Agent, or Firm* — Slater Matsil, LLP

(57) ABSTRACT

This application provides a fault detection method, an apparatus, and a system. The method includes: A transmit end apparatus includes, when sending a border gateway protocol BGP message used for advertising a route, a bidirectional forwarding detection discriminator BFD discriminator configured by the transmit end apparatus, to trigger a receive end apparatus to automatically create an SBFD session used for detecting reachability of a target object associated with the transmit end apparatus, where the target object may be a locator address or a next-hop address of the route.

18 Claims, 4 Drawing Sheets

(56) References Cited

FOREIGN PATENT DOCUMENTS

| CN | 112491638 A | 3/2021 | | |
|---|---|---|---|---|
| WO | WO-2020134739 A1 | * | 7/2020 | .......... H04L 43/0811 |

OTHER PUBLICATIONS

View of RFC 7880 "Seamless BFD Base" (Jul. 2016) to Pignataro et al. ("Pignataro"). (Year: 2016).*
IETF draft "Advertising Segment Routing Policies in BGP" draft-ietf-idr-segment-routing-te-policy-12 (May 2021) to Previdi et al. ("Previdi"). (Year: 2021).*
G. Dawra, Ed et al.: "SRv6 BGP based Overlay Services draft-ietf-bess-srv6-services-07." Apr. 11, 2021. total 30 pages.
S. Zhang et al, "BGP Link-State Extensions for Seamless BFD draft-zhuang-idr-bgp-ls-sbfd-extensions-01", Network Working Group, Internet-Draft, Intended status: Standards Track, Dec. 26, 2015, total 8 pages, XP015110436.
Z. Ali et al, "Bidirectional Forwarding Detection (BFD) for Segment Routing policies for Traffic Engineering draft-ali-spring-bfd-sr-policy-01", Spring, Internet-Draft, Intended status: Informational, Oct. 9, 2018, total 8 pages, XP015128892.

* cited by examiner

L3VPN: layer 3 virtual private network
EVPN: Ethernet virtual private network
VPWS: virtual private wire service
VPLS: virtual private local area network service
ASBR: autonomous system boundary router
AS: autonomous system
SRv6 BE: segment routing over IPv6 best-effort
PE: provider edge
CE: customer edge
BGP: border gateway protocol

FAULT DETECTION METHOD, APPARATUS, AND SYSTEM

CROSS-REFERENCE TO RELATED APPLICATIONS

This application is a continuation of International Application No. PCT/CN2022/102106, filed on Jun. 29, 2022, which claims priorities to Chinese Patent Application No. 202110806333.3, filed on Jul. 16, 2021 and Chinese Patent Application No. 202111031854.2, filed on Sep. 3, 2021. All of the aforementioned applications are hereby incorporated by reference in their entireties.

TECHNICAL FIELD

This application relates to the field of communication technologies, and in particular, to a fault detection method, an apparatus, and a system.

BACKGROUND

Bidirectional forwarding detection (BFD) is a widely used fault detection technology. When a node fault or a link fault occurs on a network, fast route switching can be implemented based on a detection result of the BFD. When a large quantity of BFD sessions are configured in a system, negotiation time of the existing BFD state machine becomes longer, which becomes a bottleneck of the entire system. Further, in conventional implementation, a large quantity of BFD sessions depend on manual static configuration. For example, in the conventional technology, a BFD for Locator session is usually statically configured to detect reachability of a locator route. Establishment of the static BFD for Locator session depends on manually and statically configuring BFD information on devices at two ends of the session. The BFD information includes but is not limited to a local discriminator (Discriminator), a peer discriminator, a detection periodicity, and the like. If there are a large quantity of locator addresses, locator network segment routing information of each node needs to be manually collected, and static BFD for locator needs to be manually deployed on each node. When a subsequent service changes, manual intervention is also needed. In this case, a workload is heavy, a configuration error may occur, and operation and maintenance is inconvenient.

SUMMARY

This application provides a fault detection method, an apparatus, and a system. According to the method provided in this application, the technical problems described in the foregoing background can be effectively resolved.

According to a first aspect, this application provides a fault detection method. The method is performed by a first communication apparatus. The method includes: The first communication apparatus receives a first border gateway protocol BGP message that is sent by a second communication apparatus and that is used for routing. The first BGP message includes a bidirectional forwarding detection BFD discriminator of the second communication apparatus. In response to receiving the first BGP message, the first communication apparatus creates a seamless bidirectional forwarding detection (SBFD) session based on the first BGP message. The SBFD session is used for detecting reachability of a target object associated with the second communication apparatus.

According to the method provided in the first aspect, when advertising a BGP route to the first communication apparatus, the second communication apparatus extends a BGP message to carry the BFD discriminator of the second communication apparatus. The BGP route triggers the first communication apparatus to serve as an initiator of the SBFD session. The first communication apparatus creates an SBFD session based on a BFD discriminator of the first communication apparatus and the received BFD discriminator of the second communication apparatus. The SBFD session can be used for detecting the reachability of the target object. The target object may be, for example, a locator address of the second communication apparatus, or the target object may be, for example, an IP address of the second communication apparatus (for example, a loopback IP address of the second communication apparatus). The IP address of the second communication apparatus may be carried in next-hop information of the first BGP message as a next-hop address of the BGP route. The target object may be, for example, a tunnel established between the first communication apparatus and the second communication apparatus. The tunnel may be, for example, a segment routing over internet protocol version 6 (SRv6) traffic engineering (TE) tunnel, an SR TE tunnel, or a multiprotocol label switching (MPLS) tunnel established between the first communication apparatus and the second communication apparatus. The MPLS tunnel may be an MPLS tunnel over IPv4, or may be an MPLS tunnel over the IPv6. Alternatively, the target object may be an SRv6 BE path established between the first communication apparatus and the second communication apparatus. When the target object is the locator address of the second communication apparatus, the SBFD session is used for detecting reachability of the locator address. In other words, the SBFD session is used for detecting reachability of a locator network segment route corresponding to the locator address. The SBFD session may also be referred to as an SBFD for locator session. Because a locator is a network segment address determined based on an SRv6 SID of the second communication apparatus, the SBFD for locator session may also be referred to as an SBFD for SRv6 locator session. When the locator address is unreachable, the first communication apparatus, as an ingress node of traffic on a current working path, may switch service traffic from the current working path to a protection path in time. The working path and the protection path are provided in relative concepts. A path currently used to transmit traffic is referred to as a working path, and a path used to provide protection switching is referred to as a protection path. When the target object is the IP address of the second communication apparatus, it may be understood that the SBFD session is used for detecting reachability of the IP address of the second communication apparatus. Because the IP address of the second communication apparatus is a next hop of the route, the SBFD session may also be understood as being used for detecting reachability of the next hop of the route. The SBFD session may also be referred to as an SBFD for common session or an SBFD for next hop session.

It should be noted that, in this application, the BGP route is a route advertised based on a BGP. The BGP route may be a BGP public network route, or may be a BGP service route, for example, a VPN route advertised based on the BGP. Specifically, the BGP route may be a route advertised by the first BGP message in the first aspect.

Based on the method provided in the first aspect, after receiving the BGP route that is sent by the second communication apparatus and that carries the BFD discriminator, the first communication apparatus, as the initiator of the SBFD session, dynamically creates the SBFD session, and fills the BFD discriminator of the second communication apparatus in a your discriminator field during status negotiation of the SBFD session. After the negotiation succeeds, the SBFD session is established successfully. The first communication apparatus periodically detects the target object based on an SBFD packet. In the foregoing method, automatic creation of an SBFD session is dynamically triggered based on advertisement of the BGP route. This effectively avoids complex configurations needed for statically configuring a BFD session. When a subsequent service changes, an SBFD session associated with the route may also be automatically deleted based on a route withdrawal message, thereby avoiding manual intervention, reducing a configuration error that may occur during manual configuration, reducing workload of network operation and maintenance personnel, simplifying operation and maintenance, and greatly improving fault detection efficiency. Further, based on the method provided in the first aspect, seamless bidirectional forwarding detection (SBFD) is used to replace conventional BFD for fault detection. The SBFD is a simplified mechanism of the BFD, and the SBFD simplifies a state machine of the BFD, shortens negotiation time and improves flexibility of entire network. Further, the BGP is extended to carry the BFD discriminator. The initiator of the SBFD session is triggered to automatically create the SBFD session for fault detection. In comparison with an interior gateway protocol (IGP) such as an intermediate system to intermediate system (ISIS) protocol or an open shortest path first (OSPF) protocol, in a inter-AS scenario, an end-to-end SBFD session is dynamically established while a route is transferred based on the BGP, to quickly establish end-to-end detection in an inter-AS network scenario. Therefore, the solution of this application has a wider application scope, and is compatible with fault detection in a plurality of network scenarios.

According to a second aspect, this application provides a fault detection method. The method is performed by a second communication apparatus. The method includes:
    generating a first border gateway protocol BGP message used for advertising a route, where the first BGP message includes a BFD discriminator of the second communication apparatus; and
    sending the first BGP message to the first communication apparatus, to trigger the first communication apparatus to create a seamless bidirectional forwarding detection SBFD session, where the SBFD session is used for detecting reachability of a target object associated with the second communication apparatus.

For technical effects implemented by the method according to the second aspect, refer to related descriptions in the method according to the first aspect. Details are not described herein again.

Optionally, in the method according to the first aspect or the second aspect, the route is a service route. Optionally, the SBFD session may be used for detecting reachability of a next hop corresponding to the service route or a locator network segment route corresponding to the service route. According to this solution, when a service goes online, the service route is advertised by using a BGP to dynamically trigger establishment of the SBFD session. In this way, establishment of a large quantity of useless SBFD sessions when no service is carried on a transmission path is effectively avoided. Not only network bandwidth resources occupied for transmitting the SBFD session in a network are reduced, but also control plane resources and forwarding plane resources that are provided by a communication apparatus for maintaining the SBFD session are reduced. Optionally, the service route includes but is not limited to one or more of the following routes: an internet protocol version 4 IPv4 route, an internet protocol version 6 IPv6 route, a virtual private network version 4 VPNv4 route, a virtual private network version 6 VPNv6 route, and an Ethernet virtual private network EVPN route.

Optionally, in the method according to the first aspect or the second aspect, a BGP route may also be a public network route. In this case, the SBFD session may be used for detecting whether a next hop corresponding to the public network route is reachable, in other words, may be used for detecting a status of a public network path. In this solution, establishment of the SBFD session can be dynamically triggered based on a BGP public network route to detect the status of the public network path in time. Service planning may be guided based on a detection result. For example, when the public network path does not meet a transmission requirement, the public network path is not planned to carry a corresponding service, to ensure reliability of service transmission.

According to a third aspect, this application provides a fault detection method. The method includes: A first communication apparatus receives a first BGP message sent by a second communication apparatus. The first BGP message is used for advertising a service route. In response to receiving the service route, the first communication apparatus creates a BFD session or an SBFD session. The BFD session or the SBFD session is used for detecting reachability of a target object associated with the second communication apparatus.

According to a fourth aspect, this application provides a fault detection method. The method is performed by a second communication apparatus. The method includes:
    generating a first BGP message. The first BGP message is used for advertising a service route; and
    sending the BGP message to a first communication apparatus, to trigger the first communication apparatus to create a BFD session or an SBFD session. The BFD session or the SBFD session is used for detecting reachability of a target object associated with the second communication apparatus.

Currently, in actual network deployment, a large quantity of end-to-end tunnels are deployed between network devices. During tunnel establishment, if a BFD or SBFD mechanism is enabled on network devices at both ends of each tunnel, a large quantity of BFD sessions or SBFD sessions are established. However, in many actual network scenarios, when a tunnel does not carry a service, a status of the tunnel does not need to be detected. To be specific, a large quantity of useless BFD sessions or SBFD sessions are deployed in the network, so that a large quantity of network bandwidth resources are occupied. Further, because a network device needs to provide corresponding control plane resources and forwarding plane resources to configure and process related BFD sessions or SBFD sessions, a large quantity of useless BFD sessions or SBFD sessions also cause a serious waste of device resources. According to the method provided in the third aspect or the fourth aspect, when a service goes online, establishment of a BFD session or an SBFD session is triggered based on a service route, so that establishment of a large quantity of useless BFD sessions or SBFD sessions can be avoided, to reduce network resources and device resources. On this basis, by using the method according to the first aspect, a BFD discriminator used to create a BFD session or an SBFD session may be carried in a BGP service route, thereby avoiding complex configuration needed for statically deploying the BFD session or the SBFD session, reducing manual intervention, reducing a configuration error, and greatly simplifying operation and maintenance.

Optionally, in the method according to the third aspect or the fourth aspect, the service route triggers the first communication apparatus to create an SBFD session for detecting reachability of a locator address of the second communication apparatus (where the session may also be referred to as an SBFD for locator session or an SBFD for SRv6 locator session, and is referred to as SBFD for locator for short below). The BGP message includes the locator address of the second communication apparatus. The BFD session or the SBFD session may detect reachability of the locator address. In other words, the BFD session or the SBFD session may detect reachability of a locator network segment route. According to the foregoing solution, in an advertisement process of the service route, reachability detection of a locator network segment route on which the service route depends is automatically established, so that a detection mechanism is established in time when a service goes online, and reliability of service transmission is improved. Further, based on the SBFD for locator, an SRv6-BE path may also be detected. When a locator route is unreachable, it indicates that the SRv6-BE path is unavailable, and fast reroute is triggered to switch traffic from a primary path to a secondary path, thereby improving reliability of service transmission.

According to a fifth aspect, this application provides a communication method. The method includes: A second communication apparatus generates a second BGP message. The second BGP message is used for withdrawing a route advertised by a first BGP message. The route can be a BGP public network route or a BGP service route. The second communication apparatus sends the second BGP message to a first communication apparatus. After receiving the second BGP message, the first communication apparatus deletes an SBFD session used for detecting a target object associated with the second communication apparatus.

According to the method provided in the fifth aspect, automatic deletion of the SBFD session triggered by a BGP route can be implemented. When the route is withdrawn, an unnecessary SBFD session can be deleted in time to reduce network resources and device resources occupied by the unnecessary SBFD session.

Optionally, in the method according to any one of the foregoing aspects, the first BGP message includes the target object. Optionally, the target object may be determined based on routing information advertised by the first BGP message. The routing information includes but is not limited to SRv6 segment identifier (SID) information and/or next hop information. For example, when the target object is a locator address, the locator address may be determined based on routing information such as an SRv6 SID and a SID structure that are carried in the first BGP message. In this case, although the locator address is not explicitly carried in the first BGP message, the locator address may be directly and undoubtedly determined based on the routing information carried in the first BGP message. Therefore, it may also be considered that the first BGP message includes the locator address. For another example, when the target object is an IP address of the second communication apparatus, a next-hop address carried in the first BGP message is the IP address of the second communication apparatus. Therefore, the IP address of the second communication apparatus may be determined based on the next-hop information in the first BGP message. Optionally, the first BGP message may be extended (for example, carrying a type length value (TLV) field) to carry the target object. Optionally, an attribute format of a BFD discriminator specified in an existing standard protocol may be reused to carry both the target object and the BFD discriminator of the second communication apparatus. The attribute format defined in the existing protocol is reused, so that improvement of the existing protocol is few, implementation costs are low, and interconnection between devices of different vendors is easier. Optionally, the target object and/or the BFD discriminator of the second communication apparatus may also be carried by using a newly added BGP attribute or a newly added BGP extended community attribute. The foregoing manner does not need to depend on a constraint format of the existing protocol, and is more flexible in protocol design.

Optionally, in the method according to any one of the foregoing aspects, the first BGP message includes a BFD discriminator attribute field, and the BFD discriminator attribute field includes the BFD discriminator. Optionally, the BFD discriminator attribute field further includes a BFD mode field, and the BFD mode field indicates to establish an SBFD session for detecting the target object. In other words, the BFD mode field indicates a type of the SBFD session to be created. The BFD mode field is set in the BFD discriminator attribute field, so that a receive end device can be instructed to automatically create, based on an indication of the BFD mode field, an SBFD session of a corresponding type. This avoids complex configuration of the receive end device, and simplifies deployment.

Optionally, in the method according to any one of the foregoing aspects, the BFD discriminator attribute field further includes a type length value TLV field, the TLV field includes check information, and the check information is used for performing matching check on the target object. After the matching check succeeds, the SBFD session is created. The foregoing operations can effectively avoid that in some network scenarios, for example, in an inter-AS virtual private network (VPN) Option B scenario, in a process of transferring the BGP route, an autonomous system boundary router (ASBR) modifies a SID address or the next-hop information, so that an SBFD session created only based on a target object determined by the BGP message cannot effectively detect connectivity between two provider edge (PE) devices.

Optionally, in the method according to any one of the foregoing aspects, the check information may also be carried in the first BGP message in another manner. For example, an extended community attribute is added to the first BGP message specifically to carry the check information. For example, the check information may also be carried in a network layer reachability information (NLRI) attribute.

Optionally, in the method according to any one of the foregoing aspects, the first communication apparatus and the second communication apparatus may belong to a same autonomous system AS domain, or may belong to different AS domains.

Optionally, in the method according to any one of the foregoing aspects, the first BGP message may carry a plurality of target objects. Therefore, the first BGP message may be used for creating a plurality of types of SBFD sessions or BFD sessions. For a type of the target object and the session type, refer to the descriptions in the foregoing aspects. Details are not described herein again.

Creating an SBFD session is used as an example. The first BGP message may include a first target object and a second target object. When receiving the first BGP message, the first communication apparatus automatically creates, based on triggering of the first BGP message, a first SBFD session used for detecting reachability of the first target object, and creates a second SBFD session used for detecting reachability of the second target object. Optionally, the first target object is a locator address of the second communication apparatus, and the first SBFD session is used for detecting reachability of the locator address of the second communication apparatus. Optionally, the second target object is an IP address of the second communication apparatus, that is, a next-hop address of a route advertised by the first BGP message. The second SBFD session is used for detecting reachability of the IP address of the second communication apparatus. In other words, the second SBFD session is used for detecting reachability of the next hop of the route.

Optionally, in the method according to any one of the foregoing aspects, the first BGP message includes an extended BFD discriminator attribute, and the extended BFD discriminator attribute is used for carrying the first target object and the second target object. Optionally, the extended BFD discriminator attribute includes first session type indication information and second session type indication information. The first session type indication information indicates that the first communication apparatus creates a first SBFD session used for detecting reachability of the first target object. The second session type indication information is used for a second SBFD session for detecting reachability of the second target object. Optionally, the extended BFD discriminator attribute includes a first TLV and a second TLV that are respectively used for carrying the first target object and the second target object. The extended BFD discriminator attribute may include a first BFD mode field and a second BFD mode field that are respectively used for carrying the first session type indication information and the second session type indication information.

Optionally, in the method according to any one of the foregoing aspects, when the first BGP message triggers establishment of a plurality of sessions, the first BGP message may carry a plurality of pieces of check information. The plurality of pieces of check information are respectively used for performing matching verification on the plurality of target objects. In response to that the verification succeeds, the first communication apparatus automatically creates different types of SBFD sessions or BFD sessions. A manner of carrying the corresponding check information is similar to that described above. For example, content carried in the first TLV and content carried in the second TLV that are included in the extended BFD discriminator attribute of the first BGP message are respectively used as first check information and second check information, to match the first target object and the second target object that are determined based on the first BGP message. Details are not described again.

According to a sixth aspect, this application provides a communication apparatus, including a transceiver unit and a processing unit. The transceiver unit is configured to perform the method according to any one of the foregoing aspects and the sending and receiving operation in any optional design of any one of the foregoing aspects. The processing unit is configured to perform the method according to any one of the foregoing aspects and another operation other than the sending and receiving operation in any optional design of any one of the foregoing aspects. For example, when the communication apparatus according to the sixth aspect is used as a first communication apparatus to perform the method according to the first aspect, the transceiver unit is configured to receive a first border gateway protocol BGP message that is sent by a second communication apparatus and that is used for advertising a route. The first BGP message includes a bidirectional forwarding detection BFD discriminator of the second communication apparatus. The processing unit is configured to create, based on the first BGP message, a seamless bidirectional forwarding detection SBFD session. The SBFD session is used for detecting reachability of a target object associated with the second communication apparatus.

According to a seventh aspect, this application provides a communication apparatus. The communication apparatus includes a memory and a processor. The memory is configured to store program code. The processor is configured to run instructions in the program code, so that the communication apparatus performs the method according to any one of the foregoing aspects and any optional design of any one of the foregoing aspects. For example, when the communication apparatus is used as a first communication apparatus to perform the method according to the first aspect, the processor executes the instructions, so that the communication apparatus is configured to: receive a first border gateway protocol BGP message that is sent by a second communication apparatus and that is used for advertising a route, where the first BGP message includes a bidirectional forwarding detection BFD discriminator of the second communication apparatus; and create, based on the first BGP message, a seamless bidirectional forwarding detection SBFD session, where the SBFD session is used for detecting reachability of a target object associated with the second communication apparatus.

According to an eighth aspect, this application provides a communication apparatus. The communication apparatus includes a communication interface and a processor. The communication interface is configured to perform the method according to any one of the foregoing aspects and the sending and receiving operation in any optional design of any one of the foregoing aspects. The processor is configured to perform the method according to any one of the foregoing aspects and another operation other than the sending and receiving operation in any optional design of any one of the foregoing aspects. For example, when the communication apparatus according to the sixth aspect is used as a first communication apparatus to perform the method according to the first aspect, the communication interface is configured to receive a first border gateway protocol BGP message that is sent by a second communication apparatus and that is used for advertising a route. The first BGP message includes a bidirectional forwarding detection BFD discriminator of the second communication apparatus. The processor is configured to create, based on the first BGP message, a seamless bidirectional forwarding detection SBFD session. The SBFD session is used for detecting reachability of a target object associated with the second communication apparatus.

According to a ninth aspect, this application provides a computer-readable storage medium. The computer-readable storage medium stores instructions. When the instructions are run on a processor, the method in any one of the foregoing aspects and some or all operations included in any optional design of any one of the foregoing aspects are implemented.

According to a tenth aspect, this application provides a computer program product, including a program. When the program is run on a processor, the method according to any one of the foregoing aspects and some or all operations included in any optional design of any one of the foregoing aspects are implemented.

According to an eleventh aspect, this application provides a communication system. The communication system includes a first communication apparatus and a second communication apparatus. The first communication apparatus may be the communication apparatus according to either of the sixth aspect and the seventh aspect, and is configured to perform some or all operations performed by the first communication apparatus in any one of the foregoing aspects and any optional design. The second communication apparatus may be the communication apparatus according to either of the sixth aspect and the seventh aspect, and is configured to perform some or all operations performed by the second communication apparatus in any one of the foregoing aspects and any optional design.

BRIEF DESCRIPTION OF THE DRAWINGS

To describe the technical solutions in embodiments of this application more clearly, the following briefly describes the accompanying drawings required for describing embodiments. It is clear that the accompanying drawings in the following description show some embodiments of this application, and a person of ordinary skill in the art may still derive other drawings from these accompanying drawings without creative efforts.

DETAILED DESCRIPTION OF ILLUSTRATIVE EMBODIMENTS

Figure 1:
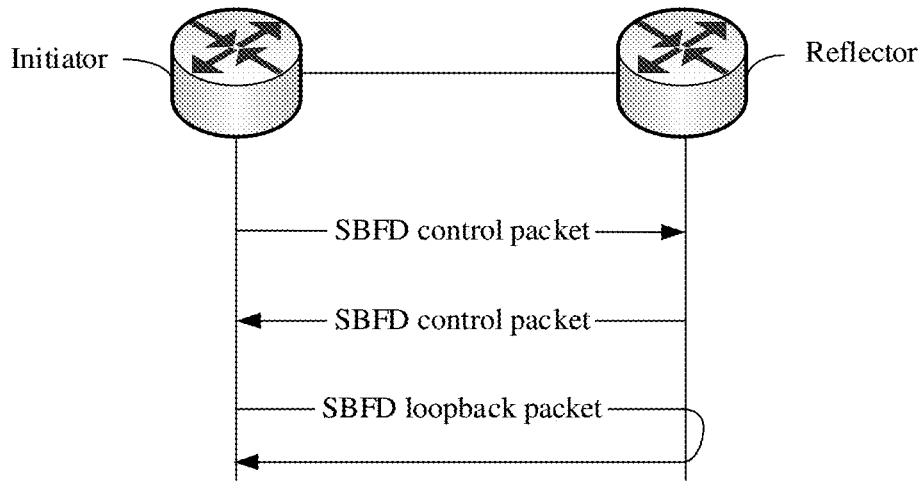
FIG. 1 is a schematic diagram of a working principle of SBFD.

The following describes technical solutions of embodiments in this application with reference to accompanying drawings. A network architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of new service scenarios, the technical solutions provided in embodiments of this application are also applicable to similar technical problems.

Ordinal numbers such as "1", "2", "3", "first", "second", and "third" in this application are used to distinguish between a plurality of objects, but are not intended to limit a sequence of the plurality of objects.

It should be understood that "A and/or B" mentioned in this application includes the following cases: Only A is included, only B is included, or both A and B are included.

The following describes some technical terms or concepts in embodiments of this application.

BFD: detects communication faults between forwarding engines. Specifically, BFD detects connectivity of a data protocol on a same path between systems. The path can be a physical link, a logical link, or a tunnel. A detection mechanism of BFD is that a BFD session is established between two systems and BFD packets are periodically sent along a path between the two systems. If either system does not receive the BFD packets within a specified period, it is considered that a fault occurs on the path. When BFD is applied to different services, the BFD packet whose sending path follows a path specified by a service is forwarded. BFD packets are encapsulated in UDP packets for transmission. In an initial phase of a session, both systems negotiate with each other by using parameters (for example, a session discriminator, expected minimum interval of sending and receiving a packet, and a local BFD session status) carried in BGD packets. After the negotiation succeeds, BFD packets are sent at a scheduled time on the path between each other based on negotiated packet sending and receiving time. The BFD distinguishes between different sessions based on my discriminator and your discriminator in packets. The BFD session is established in two manners, that is, the BFD session is established statically and the BFD session is established dynamically. In an existing implementation, a main difference between static and dynamic creation of the BFD session lies in different configuration modes for my discriminator and your discriminator. Table 1 shows a manner of establishing a BFD session in a conventional implementation. Details are not described herein again.

The BFD session mainly has four states: Down, Init, Up, and AdminDown.

Down: indicates that a session is in a Down state or has just been created.

Init: indicates that communication with a peer system can be performed, and a local system expects to set the session to an Up state.

Up: indicates that the session is established successfully.

AdminDown: indicates that the session is in an administratively Down state.

Session state changes are transferred through a state (Sta) field of a BFD control packet. A system drives a state change based on a local session state and a received peer BFD packet. A BFD state machine is usually set up and removed by using a three-way handshake mechanism, to ensure that both systems can know the state change. For further detailed descriptions of the BFD, refer to the descriptions of the conventional technology, for example, refer to related descriptions of the request for comments (RFC). Details are not described herein again.

TABLE 1

BFD session establishment manner

| BFD session establishment manner | Description |
| --- | --- |
| Statically configuring a BFD session | Statically configuring a BFD session means manually configuring, through a command line, a BFD session parameter, including configuring a local identifier, a remote identifier, and the like, and then manually delivering a BFD session establishment request. Note: When a static BFD session is configured, a BFD discriminator needs to be precisely planned in a network, to avoid incorrect configuration of a BFD session attacking a normal BFD session, resulting in session flapping. |
| Dynamically establishing a BFD session | When a BFD session is dynamically established, the system processes the local identifier and the remote identifier as follows: Dynamic allocation of the local identifier: when an application triggers dynamic creation of a BFD session, the system allocates a value that falls within a dynamic session identifier area as the local identifier of the BFD session. Then, a BFD control packet with a value of your discriminator set to o is sent to the peer for session negotiation. Automatic learning the remote identifier: when one end of the BFD session receives the BFD control packet with the value of your discriminator set to o, the value of my discriminator in the received packet is compared with a value of your discriminator on a local end to determine whether the packet matches the local BFD session. If the packet matches the local BFD session, the value of my discriminator in the received BFD packet is learned and the remote identifier is obtained. |

SBFD: is a simplified mechanism of the BFD. The SBFD simplifies a state machine of the BFD, shortens negotiation time, and improves flexibility of the entire network. In conventional implementation, a working principle of the SBFD is shown as FIG. 1. The SBFD includes an initiator and a reflector. Before link detection, the initiator and the reflector send an SBFD control packet to each other to advertise information such as an SBFD discriminator. During link detection, the initiator actively sends an SBFD echo packet, the reflector loops this packet back based on a local condition, and the initiator determines a local state based on a reflected packet. The initiator, as a detection end, has an SBFD state machine mechanism and a detection mechanism. An initiator state machine has only the Up and Down states. The initiator sends a packet only in the Up and Down states and receives a packet only in the Up or AdminDown state. The initiator first sends an SBFD packet with an initial state of Down and a destination port number 7784 to the reflector. The reflector has no SBFD state machine or detection mechanism, does not actively send an SBFD echo packet, and is only used to construct a loopback SBFD packet. The reflector receives an SBFD echo packet from the initiator and checks whether the SBFD discriminator in the packet matches a locally configured global SBFD discriminator. If the SBFD discriminator in the packet does not match a locally configured global SBFD discriminator, the packet is dropped. If the SBFD discriminator in the packet matches a locally configured global SBFD discriminator and the reflector is in a working state, a loopback SBFD packet is constructed. If the reflector is not in a working state, the packet state is set to AdminDown. For further detailed descriptions of the SBFD, refer to descriptions in the conventional technology, for example, refer to related descriptions in RFC7880. Details are not described herein again.

BFD discriminator: indicates a discriminator allocated by a local entity for BFD or SBFD. The BFD discriminator includes my discriminator and your discriminator. My discriminator is a discriminator allocated by the local entity, and your discriminator is a discriminator stored by the local entity and allocated by a peer entity. BFD or SBFD distinguishes between different sessions based on my discriminator and your discriminator in a packet.

When a session is a BFD session or an SBFD session, an initiator of the BFD session or the SBFD session fills, in a BFD packet or an SBFD packet, in a my discriminator field with a BFD discriminator allocated by itself, and fills in the your discriminator field with a BFD discriminator allocated by a peer. It should be noted that, when the session is an SBFD session, the BFD discriminator should be understood as an SBFD discriminator allocated by a local entity. In this application, for ease of description, discriminators used by the BFD session and the SBFD session are collectively referred to as a BFD discriminator. A person skilled in the art may understand meanings of the BFD discriminator.

Locator address: may also be referred to as a locator. A locator address is an IPv6 address, used for identifying an IPv6 network segment. All IPv6 addresses in the network segment can be allocated as SRv6 SIDs.

Locator network segment route: may also be referred to as a locator route. A locator route of a node refers to a network segment route to which a node SID of the node belongs. After a locator address is configured, the node can advertise a network segment route corresponding to the locator address based on a routing protocol. The network segment route is referred to as a locator network segment route. Another node in a network can locate the node through the locator network segment route, and in addition, all segment identifiers (SID) advertised by the node can also be reached through the locator network segment route. When an SRv6 packet is forwarded, a SID that indicates a destination node of the packet may be a node SID or a SID of a virtual private network (VPN) instance deployed on the node, VPN SID for short. Certainly, a SID list of an SRH may include both a SID of the destination node and the VPN SID deployed on the destination node. For a node, both the node SID and the VPN SID of the node are in a network segment indicated by the locator network segment route of the node.

Figure 2:
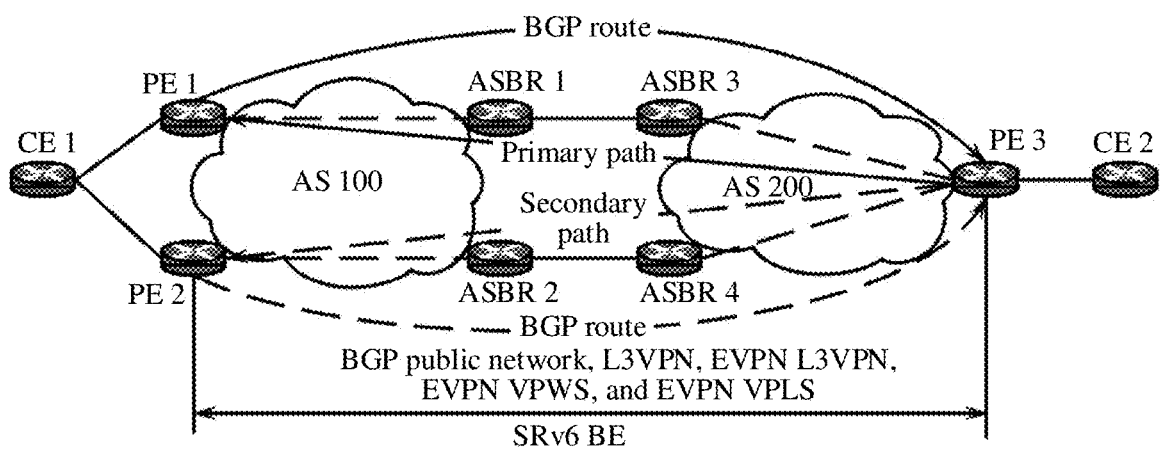
FIG. 2 is a schematic diagram of a structure of a network system to which an embodiment of this application is applied.

The following describes, with reference to FIG. 2, a network system to which an embodiment of this application is applied. FIG. 2 is a schematic diagram of a network system of an SRv6-based VPN. As shown in FIG. 2, a customer edge 1 (CE 1) is dual-homed to access a provider edge 1 (PE 1) and a provider edge 2 (PE 2), and a CE 2 accesses a provider edge 3 (PE 3). The PE 1, the PE 2, an autonomous system boundary router (ASBR) 1, and an ASBR 2 belong to an autonomous system (autonomous system, AS) 100, the PE 3, an ASBR 3 and an ASBR 4 belong to an AS 200. A path for the CE 2 to access the CE 1 is CE 2-PE 3-ASBR 3-ASBR 1-PE 1-CE 1. If a node fault occurs on the PE 1, the path for the CE 2 to access the CE 1 is CE 2-PE 3-ASBR 4-ASBR 2-PE 2-CE 1. According to a standard virtual private network (VPN) fast reroute (FRR) technology, both the PE 1 and the PE 2 advertise routes destined for the CE 1 to the PE 3. The route advertised by the PE 1 is used as an optimal route, and the route advertised by the PE 2 is a sub-optimal route. In addition, primary and secondary forwarding entries are respectively generated for the optimal route and the sub-optimal route to accelerate service switchover.

A service can be carried over a tunnel or an SRv6 BE path between the PE 1 and the PE 3 and between the PE 2 and the PE 3. The tunnel may be, for example, a VPNv4 tunnel, a multiprotocol label switching (MPLS) traffic engineering (TE) tunnel, a segment routing traffic engineering (SRTE) tunnel, a general routing encapsulation (GRE) tunnel, or a virtual extensible local area network (VxLan) tunnel. The service may be, for example, a virtual private network version 4 (VPNv4) service, a virtual private network version 6 (VPNv6) service, an Ethernet virtual private network (EVPN) service, a border gateway protocol (BGP) public network IPv4 service, or a BGP public network IPv6 service. The VPNv4 service may be, for example, an L3VPNv4 service, or may be an EVPN L3VPNv4 service. The VPNv6 service may be, for example, an L3VPNv6 service, or may be an EVPN L3VPNv6 service. The EVPN service may be, for example, an EVPN virtual private wire service (VPWS), an EVPN virtual private local area network service (VPLS), or an EVPN layer 3 virtual private network (L3VPN) service.

The following uses a network architecture shown in FIG. 2 as an example to briefly describe locator advertisement in combination with the L3VPN over SRv6 BE service scenario.

An SRv6 VPN service is established between the PE 1 and the PE 3. The PE 1 sends an L3VPN private network route 10.0.0.0/24 to the PE 3 through a BGP message, carries VPN SID:200::10 through a prefix-sid attribute and carries structure information of a SID (such as locator length). After receiving a route, the PE 3 obtains VPN-SID 200::10 and performs SRv6-BE iteration. The PE 3 calculates locator200::/32 corresponding to the remote PE 1 based on a locator block length and a locator node length in a SID Struct.

Figure 3:
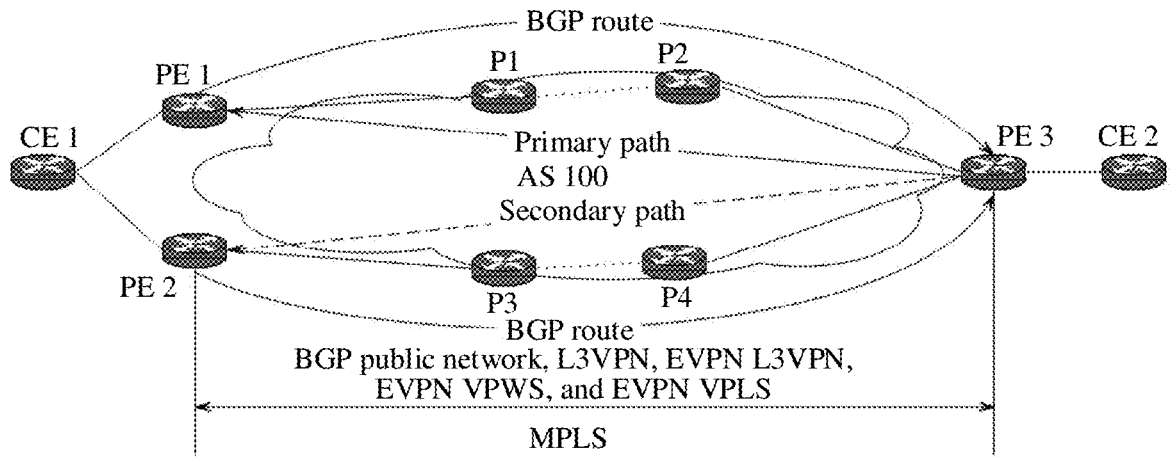
FIG. 3 is a schematic diagram of a structure of another network system to which an embodiment of this application is applied.

FIG. 3 describes another application scenario to which an embodiment of this application is applied. In a network architecture as shown in FIG. 3, a CE 1 is dual-homed to access a PE 1 and a PE 2, and a CE 2 accesses a PE 3. A plurality of provider P devices are deployed between the PE 3 and the PE 1 and between the PE 3 and the PE 2. The CE 1 sends a private network route to the PE 1. For example, when the private network route is an EVPN layer 3 service route, the PE 1 and the PE 2 separately advertise a BGP EVPN type 5 route to the PE 3. After receiving the routes advertised by the PE 1 and the PE 2, the PE 3 uses the route advertised by the PE 1 as an optimal route and generates a primary forwarding entry; and uses the route advertised by the PE 2 as a sub-optimal route and generates a secondary forwarding entry. When a node fault occurs on the PE 1 or a fault occurs on a link between the PE 1 and the PE 3, traffic may be forwarded based on the sub-optimal route, that is, traffic is forwarded based on the secondary forwarding entry. In the network architecture shown in FIG. 2, different types of tunnels may be deployed between PEs to carry services. A tunnel type and a service type are described above. Details are not described herein again. For example, when a tunnel is an MPLS tunnel, the PE 3 may forward service traffic to the PE 1 based on the MPLS tunnel. With development of an IPv6 technology, the MPLS tunnel may also be an IPv6-based MPLS tunnel.

It should be noted that the application scenarios shown in FIG. 2 and FIG. 3 are merely examples for description, and an application scenario to which embodiments of this application can be applied is not limited thereto. For example, in the scenario shown in FIG. 2, only one autonomous system boundary router may be deployed to connect different AS domains. For another example, FIG. 2 and FIG. 3 are both described by using an example in which a CE 1s dual-homed to a PE. A person skilled in the art may understand that this embodiment of this application is also applicable to a single-homing scenario.

With reference to the network scenario shown in FIG. 2, the following describes conventional implementation of BFD or SBFD. An L3VPN over SRv6 BE service is used as an example. To improve a fault detection speed, in a conventional implementation, a BFD session or an SBFD session used for detecting PE 1 and PE 2 can be deployed on the PE 3. For example, when a node fault occurs on the PE 1, the PE 3 detects, based on static BFD, that a locator address is unreachable (static BFD for locator for short below). In other words, if the PE 3 detects that a locator network segment route on which L3VPN over SRv6 BE depends is unavailable, the PE 3 sets a corresponding flag of the locator network segment route in a locator network segment route status table to unavailable and delivers the flag to a forwarding engine. After the forwarding engine hits a forwarding entry, a status of a locator network segment route corresponding to the forwarding entry is checked. If a result is that the locator network segment route is unavailable, forwarding information corresponding to the suboptimal route carried in the forwarding entry is used for forwarding. In a forwarding process, a destination address of a packet sent by the PE 3 to the PE 2 is encapsulated as a private network SRv6 SID (which may also be referred to as a VPN SID) allocated by the PE 2, the packet is forwarded to the PE 2 along a forwarding path corresponding to a locator network segment route between the PE 3 and the PE 2 and then is forwarded to the CE 1, to restore a service in a direction from the CE 2 to the CE 1, and implement fast end-to-end service convergence when the PE 1 is faulty. Static BFD for locator described above depends on manually and statically configured BFD discriminators (a local discriminator and a remote discriminator) on each PE. During BFD session negotiation, the local discriminator and remote discriminator of the BFD session need to be negotiated. When there are a large quantity of locator addresses of PEs or a large quantity of PEs related to an L3VPN service, locator network segment routing information of each PE needs to be manually collected, and static BFD for locator needs to be manually deployed on each PE. When a service changes subsequently, manual intervention is also needed, a workload is heavy, and a configuration error may occur. This seriously increases deployment complexity and difficulty of operation and maintenance. In addition, static BFD for locator needs to be deployed on PEs at both ends. This greatly occupies control plane and forwarding plane resources required for deploying a BFD session by the PEs. Even if dynamic BFD for Locator is used, BFD configuration information of both ends needs to be negotiated based on a BFD packet. Although a problem of a configuration error can be alleviated, a problem that a useless BFD session occupies a network resource and a device resource cannot be resolved. In another conventional implementation, an SBFD session used for detecting the PE 1 and the PE 2 is deployed on the PE 3 to perform connectivity detection. In the foregoing implementation, in a conventional implementation, SBFD discriminators need to be respectively configured on the PE 1 and the PE 2, and then SBFD sessions for detecting a locator route of the PE 1 and a locator route of the PE 2 need to be separately configured on the PE 3. However, when a large quantity of PEs exist in an actual network, each PE is configured with an SBFD session for detecting the PE 1 and the PE 2. This also faces problems such as a heavy workload, complex deployment, error-prone, difficult operation and maintenance, and network resource occupation.

Figure 4:
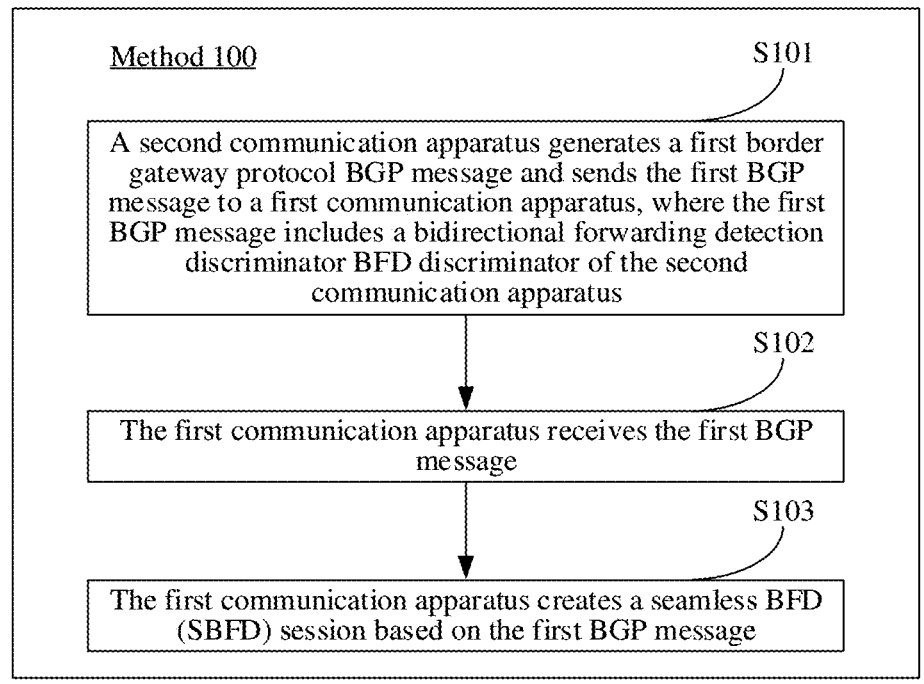
FIG. 4 is a schematic flowchart of a fault detection method according to an embodiment of this application.

In view of the problems mentioned above, this application provides a fault detection method wo shown in FIG. 4. The method 100 may be applied to the network scenario shown in FIG. 2 or FIG. 3. In the method wo, establishment of an SBFD session is dynamically triggered based on a BGP route, and a BFD discriminator used for creating the SBFD session is transferred in the BGP route, so that complex configuration needed for statically deploying the SBFD session can be effectively avoided, manual intervention is reduced, a configuration error is reduced, and operation and maintenance is greatly simplified. Further, in addition to implementing automatic SBFD session deployment, the solution provided in this application has high scalability and better network compatibility. For example, the method in this application can be applied to end-to-end detection in an inter-AS scenario, and therefore can be compatible with more network scenarios. For another example, in this application, establishment of a BFD session or an SBFD session is triggered based on a BGP service route. To be specific, when a service goes online, establishment of a BFD session or an SBFD session is triggered based on a service route. In this way, not only the BFD session or the SBFD session can be established in time for fault detection, reliability of service transmission can be ensured, but also establishment of a large quantity of useless BFD sessions or SBFD sessions can be avoided, thereby effectively reducing network resources.

When the method 100 is applied to the scenario shown in FIG. 2 or FIG. 3, a first communication apparatus in the method wo may correspond to, for example, the PE 3 shown in FIG. 2 or FIG. 3, and a second communication apparatus in the method 100 may correspond to, for example, the PE 1 or the PE 2 shown in FIG. 2 or FIG. 3.

As shown in FIG. 4, the method 100 includes the following steps S101 to S103.

S101: The second communication apparatus generates a first border gateway protocol BGP message used for advertising a route and sends the first BGP message to the first communication apparatus, where the first BGP message includes a BFD discriminator of the second communication apparatus.

In a specific implementation, in this embodiment of this application, a BFD discriminator attribute defined in RFC9026 is reused to carry the BFD discriminator of the second communication apparatus. The BFD discriminator attribute defined in RFC9026 is used for transferring information about P2MP BFD session creation in a multicast VPN (MVPN) scenario. By reusing a corresponding attribute in the existing standard, only a new type needs to be applied for a BFD mode in the IANA, so that transfer of session information used for creating an SBFD session can be completed. For the existing protocol, changes are small, and implementation costs are low.

The BFD discriminator attribute includes the following fields:

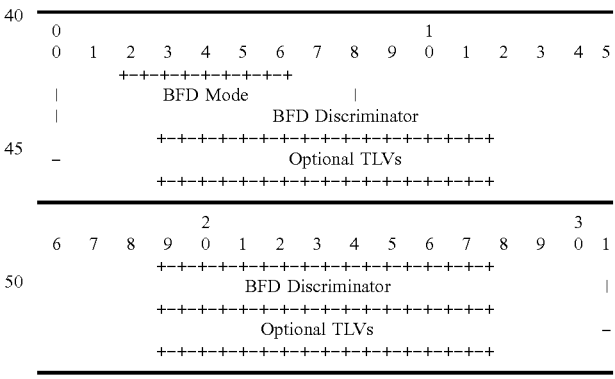

BFD mode field: A length of the field may be, for example, one byte, indicating a type of the SBFD session, in other words, indicating that the first communication apparatus establishes an SBFD session used for detecting a target object associated with the second communication apparatus. For different application scenarios, different new values need to be defined for the BFD mode in this application. For example, when the target object is a locator of the second communication apparatus, a value of the BFD mode may be, for example, 176, indicating that the BFD mode is an SBFD for SRv6 Locator Session. The SBFD for SRv6 Locator Session is used for detecting reachability of a locator address of the second communication apparatus. In other words, the SBFD for SRv6 Locator Session is used for detecting reachability of a locator network segment route of the second communication apparatus or the SBFD for SRv6 Locator Session is used for detecting reachability of an SRv6-BE path deployed between the second communication apparatus and the first communication apparatus. The SRv6-BE path forwards traffic based on the locator network segment route. When the target object is an IP address of the second communication apparatus, a value of BFD mode may be, for example, 177, indicating that the BFD mode is an SBFD for Common Session. The SBFD for Common Session is general SBFD detection. The SBFD for Common Session can be used for detecting reachability of a BGP next hop. When the target object is a tunnel, a value of the BFD mode may be, for example, 178, indicating that the BFD mode is an SBFD for tunnel session. The SBFD for tunnel session is used for detecting whether the tunnel is reachable. A person skilled in the aft may understand that a value of the BFD mode and a corresponding mode depend on a specific usage scenario and specific implementation. This application is merely an example for description, and cannot exhaust all implementations. A specific value of the BFD mode may be applied to the Internet Assigned Numbers Authority (IANA).

BFD discriminator field: A length of the field is four bytes, and a BFD discriminator of the second communication apparatus is carried, indicating that a receive end establishes an SBFD session identifier to a destination end based on information.

Optional TLVs field: is an optional type length value (TLV) field. The field is a variable-length field and is used for describing additional information needed to create an SBFD session. The additional information includes SBFD IP information. The SBFD IP information indicates a destination device address of the SBFD session, for example, a locator address of the destination device or a loopback IP address of the destination device. In actual usage, the SBFD IP information may not be used for establishing a session, but a locator address that is determined by an SRv6 SID, that is allocated by the destination end, and that is carried in BGP routing information is used as a destination address, or a next-hop address in the BGP routing information is used as a destination address to establish the SBFD session. In this case, the SBFD IP information may be used for performing matching verification on the target object. The target object includes but is not limited to the locator address or the next-hop address of the destination end that is determined based on the BGP routing information.

In a specific implementation, a format of the optional TLVs is as follows:

```
 0                   1
 0 1 2 3 4 5 6 7 8 9 0 1 2 3 4 5
 +-+-+-+-+-+-+-+-+-+-+-+-+-+-+-+-+
 |      Type       |     Length    |
 +-+-+-+-+-+-+-+-+-+-+-+-+-+-+-+-+
                   2                   3
 6 7 8 9 0 1 2 3 4 5 6 7 8 9 0 1
 +-+-+-+-+-+-+-+-+-+-+-+-+-+-+-+-+
 |                Value                ...
 +-+-+-+-+-+-+-+-+-+-+-+-+-+-+-+-+
```

A type value in the optional TLVs indicates a type of the optional TLVs. The value field is used for carrying specific additional information. One BFD discriminator attribute can carry a plurality of optional TLVs.

For specific usage of the foregoing optional TLVs, in an implementation of this application, in addition to the BFD discriminator, the SBFD for SRv6 Locator Session or the SBFD for Common Session described above needs to carry the locator address of the second communication apparatus or the IP address of the second communication apparatus. The IP address may be carried in the optional TLVs. For example, when the BFD mode is the SBFD for SRv6 Locator Session, the optional TLVs carry an SRv6 locator address, that is, a locator address allocated by the second communication apparatus. When the BFD mode is the SBFD for Common Session, the optional TLVs carry a next-hop address, that is, a BGP next hop, to be specific, the IP address of the second communication apparatus. Therefore, after receiving the route advertised by the second communication apparatus, the first communication apparatus may directly obtain the locator address of the second communication apparatus or the IP address of the second communication apparatus based on the optional TLVs field. Therefore, the SBFD session can be quickly established directly based on <discriminator, locator> information or <discriminator, next-hop address> carried in the BFD discriminator attribute field, thereby greatly improving efficiency of establishing the SBFD session. Further, based on the foregoing implementation, the following operation may be omitted: determining, based on a SID structure carried by the BGP route, the locator address used for establishing the SBFD session; and/or determining, based on next hop information of the BGP route, the next-hop address used for establishing the SBFD session. Therefore, resources occupied by a CPU for performing the foregoing operations are effectively reduced, and processing efficiency of the CPU is improved.

For specific usage of the foregoing optional TLVs, in another implementation of this application, content carried in the TLVs is consistent with content described above, but a function of the additional information is different from the function described above. A specific difference lies in that: the additional information is used by the first communication apparatus as check information, to perform the matching verification on the target object. In the implementation, the target object is carried in the first BGP message according to an existing implementation. Specifically, creating the SBFD for SRv6 locator session is used as an example. After receiving the BGP route sent by the second communication apparatus, the first communication apparatus determines, based on a SID value and a locator mask in a SID structure carried in a sub-sub-TLV carried in a prefix-SID (Prefix-SID) attribute carried in the BGP route, the locator address allocated by the second communication apparatus, and performs matching verification on a determined locator address based on the locator address of the second communication apparatus carried in the optional TLVs as the check information. If the verification succeeds, the SBFD for SRv6 locator session is created based on the locator address. The foregoing check operation is set, to effectively avoid that in some network scenarios, for example, an option B scenario, an intermediate device (for example, an ASBR) modifies a SID address or next hop information in process of transferring the BGP route, so that an SBFD session created only based on a target object determined by the BGP message cannot effectively detect connectivity between two PEs.

According to an existing BGP protocol, each BGP message can carry only one BFD discriminator attribute. Therefore, if an existing attribute field is reused, each BGP route can trigger establishment of only one type of SBFD session. To further improve efficiency of establishing an SBFD session, extending the BFD discriminator attribute may be considered, so that one extended BFD discriminator attribute can carry session information needed to be establish two or more different types of SBFD sessions. In a specific implementation, the first BGP message includes the extended BFD discriminator attribute, and the extended BFD discriminator attribute is used for carrying a first target object and a second target object. Optionally, the extended BFD discriminator attribute includes first session type indication information and second session type indication information. The first session type indication information indicates that the first communication apparatus creates an SBFD session used for detecting the first target object. The second session type indication information is used for a second SBFD session for detecting the second target object.

A possible extended BFD discriminator attribute includes, for example, the following fields:

```
+-+-+-+-+-+-+-+-+-+-+-+-+-+-+-+-+-+-+-+-+-+-+-+-+-+-+-+-+-+-+-+-+
|    Sub-Type (1)    |   BFD mode 1   |   BFD Discriminator 1   |    Optional TLV 1 ...
+-+-+-+-+-+-+-+-+-+-+-+-+-+-+-+-+-+-+-+-+-+-+-+-+-+-+-+-+-+-+-+-+
|    Sub-Type (2)    |   BFD mode 2   |   BFD Discriminator 2   |    Optional TLV 2 ...
+-+-+-+-+-+-+-+-+-+-+-+-+-+-+-+-+-+-+-+-+-+-+-+-+-+-+-+-+-+-+-+-+
|    ...
    +-+-+-+-+-+-+-+-+-+-+-+-+-+-+-+-+-+-+-+-+-+-+-+-+-+-+-+-+-+-+-+-+
```

BFD mode 1: corresponds to the first session type indication information.

BFD mode 2: corresponds to the second session type indication information.

Optional TLV 1: carries the first target object.

Optional TLV 2: carries the second target object.

As described above, in the extended BFD discriminator attribute, a plurality of sub TLVs may be set to carry a plurality of BFD modes respectively, so that one route can carry the plurality of BFD modes, and a receive end of the route is triggered to create different types of BFD sessions or SBFD sessions. For a format and a function of the optional TLVs, refer to the foregoing descriptions. Details are not described herein again. Although the SBFD session is used as an example for description above, a person skilled in the art may understand that the technical solution of this application is also applicable to establishment of a BFD session.

A person skilled in the art may understand that a specific format of the BFD discriminator attribute depends on a specific implementation, and different implementations have different specific formats. Therefore, the format of the possible BFD discriminator attribute is merely an example, and does not constitute a limitation on this embodiment of this application.

In another specific implementation, in this embodiment of this application, a new BGP attribute or an added BGP extended community attribute may be further defined to carry the BFD discriminator of the second communication apparatus.

For example, a possible format of a new BGP extended community attribute is as follows:

The format of the extended community attribute complies with the format of the extended community attribute defined in RFC4360. A type value of the extended community attribute can be reused as 0x01 while occupying Sub-Type=0x60.

In this implementation, a target object of the second communication apparatus, for example, the locator address or the IP address of the second communication apparatus, may be carried in the first BGP message according to an existing implementation. Details are not described herein. Certainly, a new attribute or an extended community attribute may be also extended or a new TLV field may be extended in an existing attribute to carry the target object. A function of the target object carried in these manners is the same as that of the target object carried based on the optional TLVs described above. For example, the target object may be directly used to create an SBFD session, or may be used as check information. Details are not described herein.

In conclusion, in this application, the existing BGP protocol is extended, and a BFD information transfer attribute is added to the BGP protocol to transfer SBFD session information. Attribute content includes but is not limited to an SBFD mode, an SBFD discriminator, and SBFD IP information (that is, the IP address carried in the optional TLVs field). The SBFD mode indicates a type of SBFD session, and mainly includes two types: a type of SBFD session dedicated to an SRv6 locator and an SBFD general type. SBFD discriminator information is an SBFD discriminator, indicating that a receive end establishes an SBFD session identifier to a destination end based on the information. The SBFD IP information indicates a destination device address of the SBFD session. For example, the SBFD IP is the locator address mentioned above or the IP address of the second communication apparatus. In actual usage, the SBFD session may not be established based on the address carried in the field. For example, in a scenario of detecting whether a next hop is reachable, the SBFD session may be established based on next hop information in the BGP routing information as the destination address.

S102: The first communication apparatus receives the first BGP message.

S103: The first communication apparatus creates an SBFD session based on the first BGP message, where the SBFD session is used for detecting reachability of a target object associated with the second communication apparatus.

As described above, the target object varies based on different specific service scenarios. The target object associated with the second communication apparatus may be, for

```
+-+-+-+-+-+-+-+-+-+-+-+-+-+-+-+-+-+-+-+-+-+-+-+-+-+-+-+-+-+-+-+-+
|           Type           |   Sub-Type   |       BFD Discriminator 1      |
+-+-+-+-+-+-+-+-+-+-+-+-+-+-+-+-+-+-+-+-+-+-+-+-+-+-+-+-+-+-+-+-+
|       BFD Discriminator      |                 Reserved=0                |
+-+-+-+-+-+-+-+-+-+-+-+-+-+-+-+-+-+-+-+-+-+-+-+-+-+-+-+-+-+-+-+-+
``` example, the locator address of the second communication apparatus, the IP address (which is used as a next-hop address of a BGP route) of the second communication apparatus, and a tunnel established between the second communication apparatus and the first communication apparatus.

The SBFD session is created based on the first BGP message, and includes various session types described in S101, including but not limited to the SBFD for SRv6 Locator Session, the SBFD for Common Session, or the SBFD for tunnel session described above. For a specific establishment process, refer to related descriptions in the conventional technology. Details are not described herein again.

In a specific implementation, the first communication apparatus creates the SBFD session based on a principle of per target object per SBFD session. For example, when the target object is a locator address, the first communication apparatus receives a plurality of host routes advertised by the second communication apparatus. The plurality of host routes correspond to a same locator address, that is, correspond to a same target object. If one SBFD session is created for each BGP route, system resources are greatly occupied. Therefore, only one SBFD session is created for a same locator address. In a specific implementation, when receiving a BGP route advertised by the second communication apparatus, the first communication apparatus obtains information associated with a target object in each route and a BFD discriminator, and uses the information associated with the target object in each route and the BFD discriminator as a key (KEY) value to generate an SBFD session management instance. As an example, the target object is a locator address. After receiving the first BGP message, the first communication apparatus obtains, based on the first BGP message, a BFD discriminator 1 and a locator 1 that are allocated by the second communication apparatus. In this way, the first communication apparatus forms a first SBFD session management instance in which {BFD discriminator 1, Locator 1} is a key value. Similarly, when receiving a BGP message sent by a third communication apparatus, the first communication apparatus obtains, based on the BGP message, a BFD discriminator 2 and a locator 2 that are allocated by the third communication apparatus. In this way, the first communication apparatus forms a second SBFD session management instance in which {BFD discriminator 2, Locator 2} is a key value. With reference to the scenario shown in FIG. 2 or FIG. 3, for example, the first communication apparatus may correspond to the PE 3, the second communication apparatus may correspond to the PE 1, and the third communication apparatus may correspond to the PE 2. After generating the two SBFD session management instances, the first communication apparatus separately creates a corresponding SBFD session based on each SBFD session management instance. For an SBFD packet sent by the first communication apparatus (as an SBFD initiator) to the second communication apparatus, a locator network segment address route allocated by the second communication apparatus is used as a packet destination address, a corresponding locator network segment route is queried, and the packet is forwarded to the second communication apparatus. After receiving the SBFD packet, the second communication apparatus switches locations of a source IP address and a destination IP address of the packet, queries a route corresponding to the SBFD source IP address, and sends a response packet to the first communication apparatus. In this way, SBFD packet interaction between the first communication apparatus and the second communication apparatus is completed, and the BGP route triggers automatic creation of SBFD for locator successfully. Interaction between the first communication apparatus and the third communication apparatus is a similar procedure. Details are not described again.

It can be learned from the foregoing descriptions that, based on the method boo provided in this application, automatic establishment of an SBFD session can be triggered based on the BGP route, to perform fault detection. In particular, the establishment of the SBFD session is triggered based on a BGP service route, so that a problem that static BFD cannot be automatically deployed when a BGP service goes online can be resolved. A dynamically deployed SBFD session provides an automatic deployment capability after the BGP service goes online. This avoids manual intervention, improves work efficiency, simplifies an operation and maintenance difficulty, and reduces more network and device resources.

Figure 5:
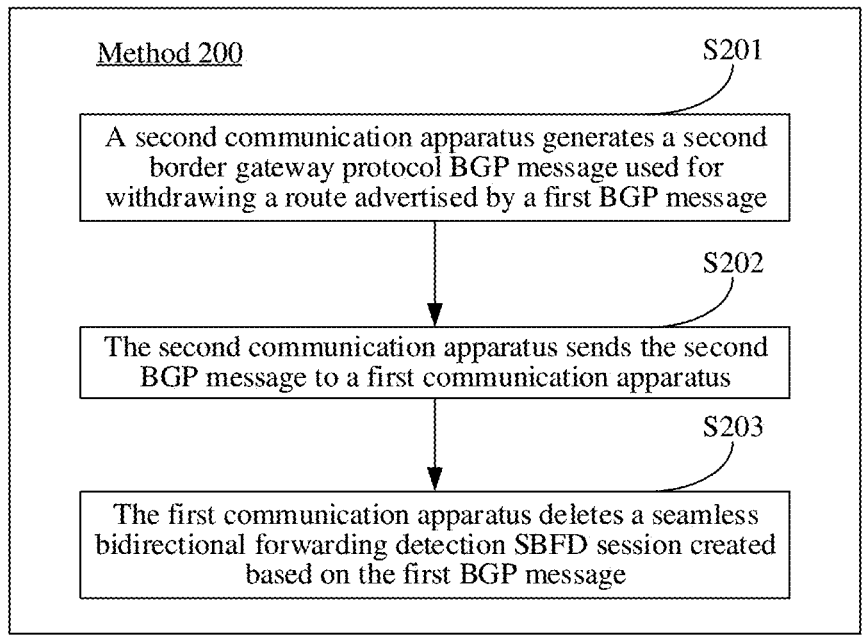
FIG. 5 is a schematic flowchart of another fault detection method according to an embodiment of this application.

In addition to the method boo, this application further provides a communication method 200. The communication method 200 is used for automatically deleting an SBFD session. The method 200 may be applied to the scenario shown in FIG. 2 or FIG. 3, and may be used independently, or may be used in combination with the method 100. A second communication apparatus in the method 200 may correspond to, for example, the PE 1 or the PE 2 in the scenario shown in FIG. 2 or FIG. 3, and a first apparatus may correspond to, for example, the PE 3 in the scenario shown in FIG. 2 or FIG. 3. As shown in FIG. 5, the method 200 includes S201 to S203.

S201: The second communication apparatus generates a second BGP message, where the second BGP message is used for withdrawing a route advertised by a first BGP message.

Before generating the second BGP message, the second communication apparatus advertises the route to the first communication apparatus by using the first BGP message.

For a specific format of the first BGP message in S201, refer to the format of the first BGP message in the method 100. Details are not described herein again.

The route can be a BGP public network route or a BGP service route. Refer to related descriptions in the method boo. Details are not described again.

S202: The second communication apparatus sends a second BGP message to the first communication apparatus.

S203: After receiving the second BGP message, the first communication apparatus deletes an SBFD session created based on the first BGP message.

Based on the foregoing operation, automatic deletion of the SBFD session triggered by a BGP route can be implemented. When the route is withdrawn, an unnecessary SBFD session can be deleted in time. This reduces waste of network resources caused by running of the unnecessary SBFD session and clears device resources occupied by the unnecessary SBFD session in time.

Figure 6:
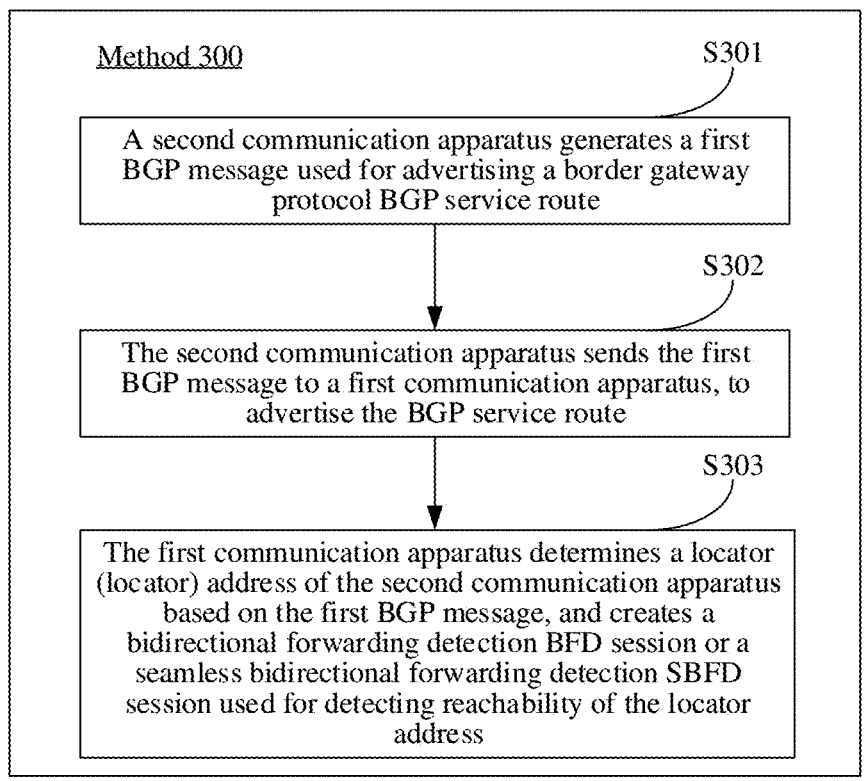
FIG. 6 is a schematic flowchart of another communication method according to an embodiment of this application.

In addition to the method 100 and the method 200, an embodiment of this application further provides a communication method 300. The communication method 300 may be applied to the scenario shown in FIG. 2 or FIG. 3, may be used independently, or may be used in combination with the method 100. A second communication apparatus in the method 300 may correspond to, for example, the PE 1 or the PE 2 in the scenario shown in FIG. 2 or FIG. 3, and a first apparatus may correspond to, for example, the PE 3 in the scenario shown in FIG. 2 or FIG. 3. As shown in FIG. 6, the method 200 includes S301 to S303.

S301: The second communication apparatus generates a first BGP message, where the first BGP message is used for advertising a BGP service route.

S302: The second communication apparatus sends the first BGP message to the first communication apparatus, to advertise the BGP service route to the first communication apparatus.

S303: The first communication apparatus receives the first BGP message, determines a locator address of the second communication apparatus based on the first BGP message, and creates, based on the determined locator address, a BFD session or an SBFD session used for detecting reachability of the locator address.

In the method 300, when a service goes online, the BGP service route advertised by the second communication apparatus triggers the first communication apparatus to automatically create an SBFD for locator session or a BFD for locator session, to detect reachability of a locator route of the second communication apparatus. In a service over SRv6-BE service scenario, especially in an end-to-end service over SRv6-BE inter-AS service scenario, the SBFD for locator session or the BFD for locator session can be established in time when a service goes online. This effectively ensures reliable transmission of a service and avoids that network resources and device resources are occupied caused by creation of a large quantity of BFD sessions or SBFD sessions when no service goes online.

In a specific implementation, SBFD information may be transferred in the first BGP message advertised in S301. The SBFD information includes but is not limited to an SBFD mode, an SBFD discriminator, and SBFD IP information. The SBFD mode indicates a type of SBFD session, and mainly includes two types: a type of SBFD session dedicated to an SRv6 locator and an SBFD general type. SBFD discriminator information is an SBFD discriminator, indicating that a receive end establishes an SBFD session identifier to a destination end based on the information. The SBFD IP information indicates a destination device address of the SBFD session. The SBFD IP information is a locator address of a destination device. In actual usage, the SBFD IP information may not be used to establish a session, but the locator is determined based on an SRv6 SID and SID structure information that are carried in BGP routing information (where it is determined based on the manner that the locator is an existing implementation, and details are not described again), to establish the session. The SBFD IP information may also be used as check information. After receiving the BGP route, the receive end performs, based on the SBFD IP information, matching verification on the locator determined based on the BGP route information. If the verification succeeds, the session is created. For a specific implementation of transferring the SBFD information in the first BGP message, refer to related descriptions in the method 100. In embodiments of this application, differences between different embodiments are mainly described. For a same part and a technical effect in embodiments, refer to each other. Details are not described again.

In this embodiment of this application, the first communication apparatus and the second communication apparatus may be a physical device such as a router and a switch, may be a server on which a virtual router or a virtual switch is deployed, or may be a component such as a board, a line card, and a chip that is deployed in the physical device or server and that are configured to implement some or all operations of the method 100, the method 200, or the method 300.

In this embodiment of this application, the BGP route and the route advertised based on the BGP message have a same meaning, and both are often used alternately. The BGP service route and the service route advertised based on the BGP message have a same meaning, and both are often used alternately.

Figure 7:
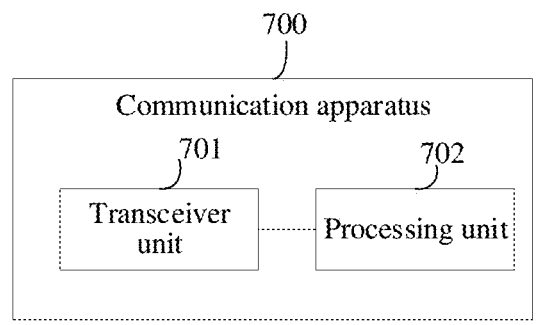
FIG. 7 is a schematic diagram of a structure of a communication apparatus according to an embodiment of this application.

In addition, an embodiment of this application further provides a communication apparatus 700. FIG. 7 is a schematic diagram of a structure of a communication apparatus according to an embodiment of this application. The communication apparatus 700 includes a transceiver unit 701 and a processing unit 702. The communication apparatus 700 may be configured to perform the method 100, the method 200, or the method 300 in the foregoing embodiments.

In an example, the communication apparatus 700 may perform the method 100 in the foregoing embodiment. When the communication apparatus 700 is configured to perform the method 100 in the foregoing embodiment, the communication apparatus 700 is equivalent to the first communication apparatus in the method 100. The transceiver unit 701 is configured to perform the sending and receiving operation performed by the first communication apparatus in the method 100. The processing unit 702 is configured to perform an operation other than the sending and receiving operation performed by the first communication apparatus in the method wo. For example, the transceiver unit 701 is configured to receive a first border gateway protocol BGP message that is sent by a second communication apparatus and that is used for advertising a route. The first BGP message includes a bidirectional forwarding detection BFD discriminator of the second communication apparatus. The processing unit 702 is configured to create, based on the first BGP message, a seamless bidirectional forwarding detection SBFD session. The SBFD session is used for detecting reachability of a target object associated with the second communication apparatus.

In an example, the communication apparatus 700 may perform the method boo in the foregoing embodiment. When the communication apparatus 700 is configured to perform the method boo in the foregoing embodiment, the communication apparatus 700 is equivalent to the second communication apparatus in the method boo. The transceiver unit 701 is configured to perform the sending and receiving operation performed by the second communication apparatus in the method boo. The processing unit 702 is configured to perform an operation other than the sending and receiving operation performed by the second communication apparatus in the method boo. For example, the processing unit 702 is configured to generate a first border gateway protocol BGP message used for advertising a route. The first BGP message includes a BFD discriminator (discriminator) of the second communication apparatus. The transceiver unit 701 is configured to send the first BGP message to the first communication apparatus, to trigger the first communication apparatus to create a seamless bidirectional forwarding detection SBFD session. The SBFD session is used for detecting reachability of a target object associated with the second communication apparatus.

In an example, the communication apparatus 700 may perform the method 200 in the foregoing embodiment. When the communication apparatus 700 is configured to perform the method 200 in the foregoing embodiment, the communication apparatus 700 is equivalent to the first communication apparatus in the method 200. The transceiver unit 701 is configured to perform the sending and receiving operation performed by the first communication apparatus in the method 200. The processing unit 702 is configured to perform an operation other than the sending and receiving operation performed by the first communication apparatus in the method 200. For example, the transceiver unit 701 is configured to receive a second BGP message that is sent by the second communication apparatus and that is used for withdrawing a route advertised by the first BGP message. The processing unit 702 is configured to delete an SBFD session created based on the first BGP message.

In an example, when the communication apparatus 700 is configured to perform the method 200 in the foregoing embodiment, the communication apparatus 700 is equivalent to the second communication apparatus in the method 200. The transceiver unit 701 is configured to perform the sending and receiving operation performed by the second communication apparatus in the method 200. The processing unit 702 is configured to perform an operation other than the sending and receiving operation performed by the second communication apparatus in the method 200. For example, the processing unit 702 is configured to generate a second BGP message. The second BGP message is used for withdrawing a route advertised by a first BGP message. The transceiver unit 701 is configured to send the second BGP message to the first communication apparatus, to trigger the first communication apparatus to delete an SBFD session created based on the first BGP message.

In an example, the communication apparatus 700 may perform the method 300 in the foregoing embodiment. When the communication apparatus 700 is configured to perform the method 300 in the foregoing embodiment, the communication apparatus 700 is equivalent to the first communication apparatus in the method 300. The transceiver unit 701 is configured to perform the sending and receiving operation performed by the first communication apparatus in the method 300. The processing unit 702 is configured to perform an operation other than the sending and receiving operation performed by the first communication apparatus in the method 200. For example, the transceiver unit 701 is configured to receive a first BGP message sent by a second communication apparatus. The first BGP message is used for advertising a BGP service route. The processing unit 702 is configured to determine, based on the first BGP message, a locator address of the second communication apparatus, and create, based on the determined locator address, a BFD session or an SBFD session used for detecting reachability of the locator address.

In an example, the communication apparatus 700 may perform the method 30o in the foregoing embodiment. When the communication apparatus 700 is configured to perform the method 30o in the foregoing embodiment, the communication apparatus 700 is equivalent to the second communication apparatus in the method 300. The transceiver unit 701 is configured to perform the sending and receiving operation performed by the second communication apparatus in the method 300. The processing unit 702 is configured to perform an operation other than the sending and receiving operation performed by the second communication apparatus in the method 200. For example, the processing unit 702 is configured to generate the first BGP message used for advertising the BGP service route. The transceiver unit 701 is configured to send the first BGP message to the first communication apparatus, to advertise the BGP service route to the first communication apparatus.

It should be noted that, in this embodiment of this application, division into the units is an example, and is merely a logical function division. In actual implementation, another division manner may be used. Functional units in this embodiment of this application may be integrated into one processing unit, or each of the units may exist alone physically, or two or more units are integrated into one unit. For example, in the foregoing embodiment, the transceiver unit 701 and the processing unit 702 may be a same unit or different units. The integrated unit may be implemented in a form of hardware, or may be implemented in a form of a software functional unit.

Figure 8:
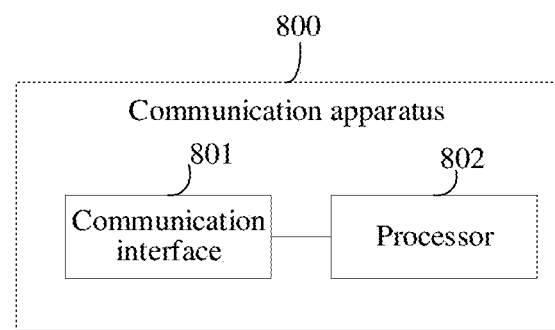
FIG. 8 is a schematic diagram of a structure of a communication apparatus according to an embodiment of this application.

In addition, an embodiment of this application further provides a communication apparatus 800. FIG. 8 is a schematic diagram of a structure of a communication apparatus according to an embodiment of this application. The communication apparatus 800 includes a communication interface 801 and a processor 802 connected to the communication interface 801. The communication interface is, for example, an apparatus such as a transceiver. The communication apparatus 800 may be configured to perform the method 100, the method 200, or the method 300 in the foregoing embodiments. Specifically, the communication apparatus 800 may be used as a first communication apparatus, to separately perform the operation performed by the first communication apparatus in the method 100, the method 200, or the method 300. Alternatively, the communication apparatus 800 may be used as a second communication apparatus, to separately perform the operation performed by the second communication apparatus in the method 100, the method 200, or the method 300. The communication interface 801 is configured to perform the sending and receiving operation performed by the first communication apparatus or the second communication apparatus in the foregoing method embodiments. The processor 802 is configured to perform an operation other than the sending and receiving operation performed by the first communication apparatus or the second communication apparatus in the foregoing method embodiments. For example, when the communication apparatus 800 is used as a first communication apparatus to perform the method 100, the communication interface 801 is configured to receive a first border gateway protocol BGP message that is sent by a second communication apparatus and that is used for advertising a route. The first BGP message includes a bidirectional forwarding detection BFD discriminator (discriminator) of the second communication apparatus. The processor 802 is configured to create, based on the first BGP message, a seamless bidirectional forwarding detection SBFD session. The SBFD session is used for detecting reachability of a target object associated with the second communication apparatus.

Figure 9:
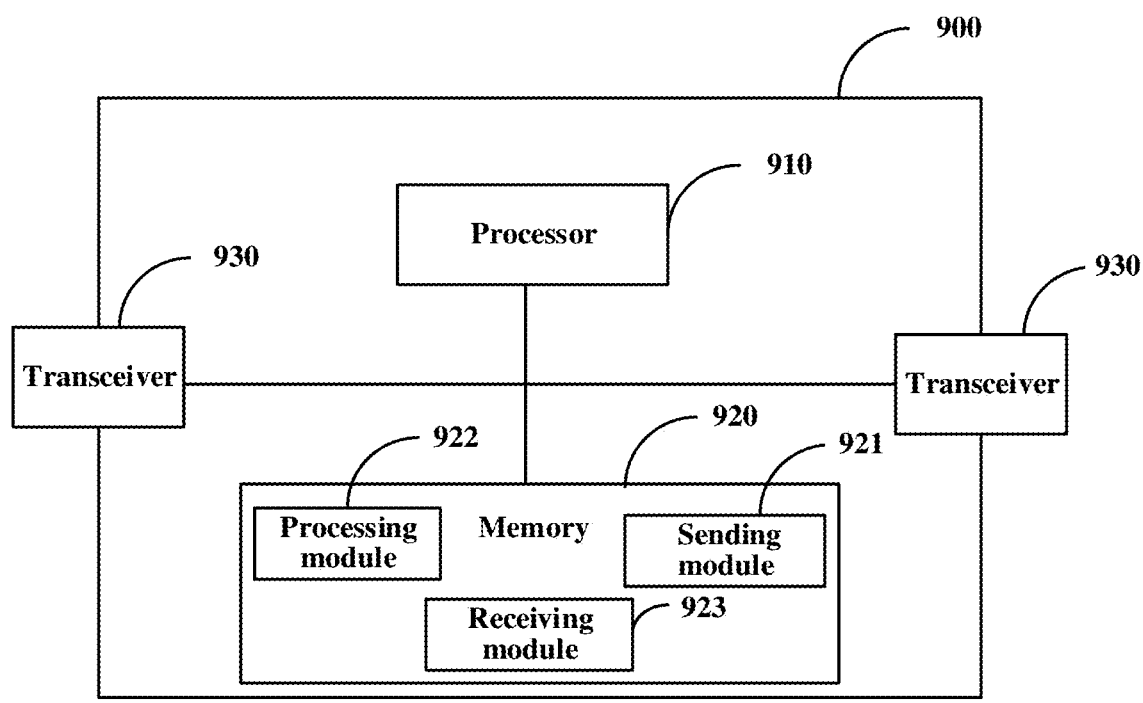
FIG. 9 is a schematic diagram of a structure of a communication apparatus according to an embodiment of this application.

In addition, an embodiment of this application further provides a communication apparatus 900. FIG. 9 is a schematic diagram of a structure of a communication apparatus according to an embodiment of this application. As shown in FIG. 9, the communication apparatus 900 may include a processor 910, a memory 920 coupled to the processor 910, and a transceiver 930. The transceiver 930 may be, for example, a communication interface, or an optical module. The processor 910 may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 910 may be one processor, or may include a plurality of processors. The memory 920 may include a volatile memory such as a random-access memory (RAM). The memory may also include a non-volatile memory such as a read-only memory (ROM), a flash memory, a hard disk drive (HDD), or a solid-state drive (SSD). The memory 920 may further include a combination of the foregoing types of memories. The memory 920 may be one memory, or may include a plurality of memories. In an implementation, the memory 920 stores computer-readable instructions. The computer-readable instructions include a plurality of software modules, for example, a sending module 921, a processing module 922, and a receiving module 923. The sending module 921 indicates a sending-related operation, the receiving module 923 indicates a receiving-related operation, and the processing module indicates a processing-related operation. After executing each software module, the processor 910 may perform a corresponding operation based on indication of each software module. An operation performed by a software module is actually an operation performed by the processor 910 based on indication of the software module. Optionally, the processor 910 may also store program code or instructions for executing the solutions of this application. In this case, the processor 910 does not need to read the program code or the instructions from the memory 920.

The communication apparatus 900 may be configured to perform the method 100, the method 200, or the method 300 in the foregoing embodiments. Specifically, the communication apparatus 900 may be used as a first communication apparatus, to separately perform the operation performed by the first communication apparatus in the method 100, the method 200, or the method 300. Alternatively, the communication apparatus 900 may be used as a second communication apparatus, to separately perform the operation performed by the second communication apparatus in the method 100, the method 200, or the method 300. For example, when the communication apparatus 900 is used as a first communication apparatus to perform the method 100, the processor 910 is configured to execute related instructions in the memory 920, so that the communication apparatus 900 is configured to: receive a first border gateway protocol BGP message that is sent by a second communication apparatus and that is used for advertising a route, where the first BGP message includes a bidirectional forwarding detection BFD discriminator of the second communication apparatus; and create, based on the first BGP message, a seamless bidirectional forwarding detection SBFD session, where the SBFD session is used for detecting reachability of a target object associated with the second communication apparatus.

An embodiment of this application further provides a computer-readable storage medium. The computer-readable storage medium stores instructions. When the instructions are run on a processor, any one or more operations in the method (for example, the method 100, the method 200, or the method 300) in any one of the foregoing embodiments are implemented.

An embodiment of this application further provides a computer program product, including a computer program. When the computer program product is run on a processor, any one or more operations in the method (for example, the method 100, the method 200, or the method 300) in any one of the foregoing embodiments are implemented.

An embodiment of this application further provides a communication system, including a first communication apparatus and a second communication apparatus. Structures of the first communication apparatus and the second communication apparatus are shown in any communication apparatus corresponding to FIG. 7 to FIG. 9. The communication system may be, for example, the communication system shown in FIG. 2 or FIG. 3. The communication system is configured to implement some or all of the operations in any one of the method 100, the method 200, and the method 300 in embodiments corresponding to FIG. 4 to FIG. 6.

An embodiment of this application further provides another communication system, including at least one memory and at least one processor. The at least one memory stores instructions, and the at least one processor executes the instructions, so that the communication system implements some or all of the operations in any one of the method 100, the method 200, and the method 300 in any one of the foregoing embodiments of this application.

An embodiment of this application further provides a chip system, including a processor. The processor is coupled to a memory, and the memory is configured to store a program or instructions. When the program or the instructions are executed by the processor, the chip system is enabled to implement some or all of the operations in any one of the method 100, the method 200, and the method 300 in any one of the foregoing embodiments of this application.

Optionally, there may be one or more processors in the chip system. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be an FPGA, an ASIC, a system on chip (SoC), a CPU, an NP, a digital signal processor (DSP), a microcontroller unit (MCU), a programmable logic device (PLD), or another integrated chip.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way is interchangeable in proper circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of embodiments.

In addition, service units in embodiments of this application may be integrated into one processing unit, each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this application essentially, a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The storage medium includes any medium that can store program code, such as a USB flash drive, a removable hard disk, a read-only memory (Read-Only Memory, ROM), a random access memory (Random Access Memory, RAM), a magnetic disk, or an optical disc.

A person skilled in the art should be aware that in the foregoing one or more examples, services described in the present invention may be implemented by hardware, software, firmware, or any combination thereof. When the services are implemented by using software, the services may be stored in a computer-readable medium or transmitted as one or more instructions or code in the computer-readable medium. The computer-readable medium includes a computer storage medium and a communication medium. The communication medium includes any medium that enables a computer program to be transmitted from one place to another. The storage medium may be any available medium accessible to a general-purpose or a dedicated computer.

The objectives, technical solutions, and beneficial effects of the present invention have been further described in detail in the foregoing specific implementations. It can be understood that the foregoing descriptions are merely specific implementations of the present invention.

In conclusion, the foregoing embodiments are merely intended for describing the technical solutions of this application instead of limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, performed by a first communication apparatus, the method comprising:
   receiving a first border gateway protocol (BGP) route advertisement message that is sent by a second communication apparatus and that advertises a service route, wherein the first BGP route advertisement message comprises a bidirectional forwarding detection (BFD) discriminator of the second communication apparatus, wherein the first BGP route advertisement message comprises a BFD discriminator attribute field, wherein the BFD discriminator attribute field comprises the BFD discriminator and a BFD mode field, and wherein the BFD mode field indicates a type of a seamless bidirectional forwarding detection (SBFD) session; and
   creating the SBFD session based on the first BGP route advertisement message, wherein the SBFD session is used for detecting reachability of a target object associated with the second communication apparatus.

2. The method according to claim 1, wherein the target object is a locator address of the second communication apparatus or an internet protocol (IP) address of the second communication apparatus.

3. The method according to claim 1, wherein the first BGP route advertisement message comprises the target object.

4. The method according to claim 3, wherein the first BGP route advertisement message comprises a type length value (TLV) field, and the TLV field comprises the target object.

5. The method according to claim 1, wherein creating the SBFD session based on the first BGP route advertisement message comprises:
   creating the SBFD session based on an indication of the BFD mode field.

6. The method according to claim 1, wherein the BFD discriminator attribute field further comprises a type length value (TLV) field, and the TLV field comprises the target object.

7. The method according to claim 1, wherein the BFD discriminator attribute field further comprises a type length value (TLV) field, the TLV field comprises check information, and the check information is used for performing matching check on the target object.

8. The method according to claim 1, wherein the first BGP route advertisement message further comprises check information, and before creating the SBFD session, the method further comprises:
   determining that the check information matches the target object.

9. The method according to claim 1, further comprising:
   creating the SBFD session based on a principle of per target object per SBFD session.

10. The method according to claim 1, further comprising:
    receiving a second BGP route withdrawal message that is sent by the second communication apparatus and that is used for withdrawing the service route; and deleting the SBFD session in response to receiving the second BGP route withdrawal message.

11. The method according to claim 1, wherein the first communication apparatus sends traffic to the second communication apparatus based on segment routing over internet protocol version 6 best-effort (SRv6 BE).

12. The method according to claim 1, wherein the first communication apparatus sends traffic to the second communication apparatus based on multiprotocol label switching over internet protocol version 6 (IPv6-MPLS).

13. A method, wherein the method is performed by a second communication apparatus, and the method comprises:
generating a first border gateway protocol (BGP) route advertisement message that advertises a service route, wherein the first BGP route advertisement message comprises a bidirectional forwarding detection (BFD) discriminator of the second communication apparatus, wherein the first BGP route advertisement message comprises a BFD discriminator attribute field, wherein the BFD discriminator attribute field comprises the BFD discriminator and a BFD mode field, and wherein the BFD mode field indicates a type of a seamless bidirectional forwarding detection (SBFD) session; and
sending the first BGP route advertisement message to a first communication apparatus, to trigger the first communication apparatus to create the SBFD session, wherein the SBFD session is used for detecting reachability of a target object associated with the second communication apparatus.

14. The method according to claim 13, wherein the target object is a locator address of the second communication apparatus or an internet protocol (IP) address of the second communication apparatus.

15. A first communication apparatus, comprising:
a memory, comprising instructions; and
a processor coupled to the memory, wherein when the instructions are executed by the processor, the first communication apparatus is enabled to:
receive a first border gateway protocol (BGP) route advertisement message that is sent by a second communication apparatus and that is used for advertising a service route, wherein the first BGP route advertisement message comprises a bidirectional forwarding detection (BFD) discriminator of the second communication apparatus, wherein the first BGP route advertisement message comprises a BFD discriminator attribute field, wherein the BFD discriminator attribute field comprises the BFD discriminator and a BFD mode field, and wherein the BFD mode field indicates a type of a seamless bidirectional forwarding detection (SBFD) session; and
create the SBFD session based on the first BGP route advertisement message, wherein the SBFD session is used for detecting reachability of a target object associated with the second communication apparatus.

16. The method according to claim 1, wherein the service route comprises one or more of: an internet protocol version 4 (IPV4) route, an internet protocol version 6 (IPv6) route, a virtual private network version 4 (VPNv4) route, a virtual private network version 6 (VPNv6) route, a virtual private network (VPN) route, or an Ethernet virtual private network (EVPN) route.

17. The method according to claim 1, wherein:
a value in the BFD mode field indicates an SBFD for an SRv6 locator session, or
a value in the BFD mode field indicates an SBFD for a Common Session.

18. The method according to claim 1, the method further comprising:
sending, by the first communication apparatus, traffic to the second communication apparatus based on segment routing over IPv6 best-effort (SRv6 BE).

* * * * *